US012801838B2

(12) United States Patent
Wang

(10) Patent No.: US 12,801,838 B2
(45) Date of Patent: Nov. 17, 2026

(54) METHOD FOR INPUTTING HANDWRITTEN FORM DATA INTO A PDF ELECTRONIC FORM

(71) Applicant: FUJIAN FOXIT SOFTWARE DEVELOPMENT JOINT STOCK CO., LTD., Fuzhou City (CN)

(72) Inventor: Jinming Wang, Fuzhou City (CN)

(73) Assignee: FUJIAN FOXIT SOFTWARE DEVELOPMENT JOINT STOCK CO., LTD., Fuzhou City (CN)

( * ) Notice: Subject to any disclaimer, the term of this patent is extended or adjusted under 35 U.S.C. 154(b) by 101 days.

(21) Appl. No.: 18/730,427

(22) PCT Filed: Aug. 4, 2023

(86) PCT No.: PCT/CN2023/111252

§ 371 (c)(1),
(2) Date: Jul. 19, 2024

(87) PCT Pub. No.: WO2024/027827

PCT Pub. Date: Feb. 8, 2024

(65) Prior Publication Data

US 2025/0156627 A1 May 15, 2025

(30) Foreign Application Priority Data

Aug. 5, 2022 (CN) ......................... 202210938107.5

(51) Int. Cl.
*G06F 40/166* (2020.01)
*G06V 30/22* (2022.01)
*G06V 30/412* (2022.01)

(52) U.S. Cl.
CPC ............ *G06F 40/166* (2020.01); *G06V 30/22* (2022.01); *G06V 30/412* (2022.01)

(58) Field of Classification Search
CPC ..... G06F 40/166; G06V 30/412; G06V 30/22
See application file for complete search history.

(56) References Cited

U.S. PATENT DOCUMENTS

2002/0044687 A1 4/2002 Federman
2005/0050065 A1 * 3/2005 Wilson .................... G06F 16/93

(Continued)

FOREIGN PATENT DOCUMENTS

CN 102289322 A 12/2011
CN 105844249 A 8/2016

(Continued)

OTHER PUBLICATIONS

International Search Report for PCT/CN2023/111252, dated Oct. 26, 2023, 5 pages.

*Primary Examiner* — Mohammed H Zuberi
(74) *Attorney, Agent, or Firm* — Rankin, Hill & Clark LLP

(57) ABSTRACT

A method for inputting handwritten form data into a PDF electronic form, comprising: first, converting a paper form into a PDF electronic form; subsequently, constructing a mask form field in the range of a PDF page according to handwritten characters; and then, respectively adding corresponding PDF scripts to the mask form field and an input form field in the PDF electronic form, the content executed by the PDF script of the mask form field being: if a user clicks the mask form field, the mask form field disappearing, automatically focusing on the input form field below the mask form field and entering an editing state, and after the user quits the editing, redisplaying the mask form field; and the content executed by the PDF script of the input form field being: hiding the mask form field after acquiring a focus, and redisplaying the mask form field after losing the focus. The present invention can save the original input handwriting of users and ensure that the appearances of the (Continued)

electronic forms are highly consistent with the appearances of the handwritten paper forms, and also may ensure that the content input by users can be processed by background applications of the electronic forms.

3 Claims, 1 Drawing Sheet

(56) References Cited

U.S. PATENT DOCUMENTS

2005/0057779 A1 3/2005 Sesek et al.
2007/0064130 A1* 3/2007 Hollins .............. H04N 1/00244 348/275
2010/0128922 A1* 5/2010 Navon ............... G06V 30/1444 707/758
2011/0271173 A1* 11/2011 Ait-Mokhtar ......... G06F 40/174 715/226
2012/0314954 A1* 12/2012 Moore ............... H04N 1/32144 235/375
2015/0129653 A1* 5/2015 Gupta ................. G06F 16/9554 235/494
2017/0337172 A1* 11/2017 Dunn ..................... G06Q 10/10

FOREIGN PATENT DOCUMENTS

CN 112529989 A 3/2021
CN 114721533 A 7/2022

* cited by examiner

METHOD FOR INPUTTING HANDWRITTEN FORM DATA INTO A PDF ELECTRONIC FORM

TECHNICAL FIELD

The present invention relates to the field of PDF document processing, and in particular, to a method for inputting handwritten form data into a PDF electronic form.

BACKGROUND

Optical character recognition (OCR) is a technology that electronically or mechanically convert an image of typed, handwritten or printed text into machine-encoded text, to extract meaningful text characters from a scanned document, a document photo, a photo scenes, or subtitle text superimposed on the image, etc. OCR is a process of analyzing and recognizing image files of text materials to acquire word and layout information.

The most common solutions to convert handwritten forms into PDF electronic forms are as follows:

(1) use a scanner to scan and convert a user handwritten form into a picture, and then directly convert the picture file into a PDF document as a final electronic form for archiving.

(2) use a scanner to scan and convert a user handwritten form into a picture, perform optical character recognition on a form area handwritten by the user to recognize user's written text content, automatically fill in results of the optical character recognition into corresponding form fields of an original electronic form, and finally generate a PDF electronic form file containing the data input by the user.

The solution (1) has the following problems as follows:

The text data inputted by a user cannot be read and processed by an application of the electronic form, because the original electronic form and the content input by the user have been converted into pictures, and the data information of the document has been pictorialized, making it difficult for the application to acquire.

The solution (2) has the problems as follows:

The appearances of words handwritten and input by the user cannot be saved. The input text will be displayed uniformly in a certain font. All user inputs will be displayed in the same font, and thus the user's own unique "handwriting" cannot be restored. For example, for contract-type forms, it may be desired to save the user's "handwriting", which cannot be implemented by means of solution (2).

SUMMARY

The present invention provides a method for inputting handwritten form data into a PDF electronic form to solve the above-mentioned problems existing in the prior art.

In order to achieve the above objective, the present invention provides a method for inputting handwritten form data into a PDF electronic form, which includes:

S1, handwriting, by a user, a paper form;

S2, performing electronic processing on the paper form handwritten by the user to obtain a corresponding PDF electronic form;

S3, performing optical character recognition on the PDF electronic form to obtain a character strings and locations of all characters in the PDF electronic form;

S4, constructing a page coordinate system for the PDF electronic form to acquire coordinates of an input form field of the PDF electronic form in the page coordinate system;

S5, calculating coordinates of the input form field in the physical coordinate system;

S6, constructing a user input area and initializing the user input area, wherein the range of the initialized user input area is the same as the range of the input form field;

S7, traversing each character in the character string acquired in step S3 with a traversal rule as follows: for each character, if the physical coordinates of the location of the character intersect with the physical coordinates of the input form field, the area where the character is located is further incorporated in the user input area until all characters in the character string are traversed;

S8, according to the user input area obtained in step S7, creating a mask form field corresponding to the input form field on a page of the PDF electronic form, and defining a type of the mask form field as "button";

S9, defining a value of the input form field as the character string acquired in step S3;

S10, intercepting a picture corresponding to the mask form field from the PDF electronic form and setting the picture as the appearance of the mask form field;

S11, adding a PDF script to the mask form field, the content executed by the PDF script of the mask form field being: if the user clicks the mask form field, the mask form field disappearing, automatically focusing the input form field below the mask form field and entering an editing state; and after the user quits the editing, redisplaying the mask form field; and S12, adding a PDF script to the input form field, the content executed by the PDF script of the input form field being: hiding the mask form field after acquiring a focus, and redisplaying the mask form field after losing the focus.

In an embodiment of the present invention, the paper form has at least one table, and correspondingly, the electronic form has at least one input form field.

In an embodiment of the present invention, the electronic processing on the paper form in step S2 is performed through a scanner.

The method for inputting handwritten form data into a PDF electronic form provided by the present invention can save the original input handwriting of users and ensure that the appearances of the electronic forms are highly consistent with the appearances of the handwritten paper forms, and also may ensure that the content input by user can be processed by background applications of the electronic forms.

BRIEF DESCRIPTION OF THE DRAWINGS

In order to explain the technical solutions in embodiments of the present invention or the prior art more clearly, the accompanying drawings to be used in the description of the embodiments or prior art will be briefly described below. Obviously, the drawings in the following description are only some embodiments of the present invention, and a person of ordinary skill in the art may also obtain other drawings based on these drawings without creative effort.

DETAILED DESCRIPTION

Figure 1:
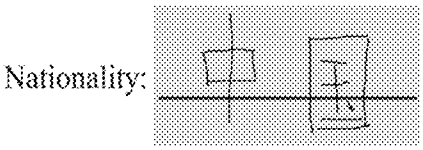
FIG. 1 is a schematic diagram of a mask form field according to an embodiment of the present invention.

The technical schemes in the embodiments of the present invention will be clearly and completely described as below with reference to the accompanying drawings in the embodiments of the present invention. Obviously, the described embodiments are only some of, not all of, the embodiments of the present invention. All other embodiments obtained by a person of ordinary skill in the art based on the embodiments of the present invention without creative effort shall fall into the protection scope of the present invention.

After a user handwrites a paper form, by using the method of converting the handwritten form into a PDF electronic form in the prior art, only the content handwritten by the user can be converted into a picture, but the handwritten characters cannot be recognized as computer-recognizable characters; or the handwritten content can only be recognized as computer-recognizable characters, but the user's handwriting cannot be retained. The present invention overcomes the defects in the prior art and can recognize the characters handwritten by the user as computer-recognizable characters while saving the original handwriting of the user.

An embodiment of the present invention provides a method for inputting handwritten form data into a PDF electronic form, which includes:

At S1, a user handwrites a paper form.

The paper form is generally made by a user through a computer, for example, through document processing software that can draw tables, such as word, excel, etc., and then the made paper form is printed by a printer. Alternatively, the paper form can also be drawn manually by the user. The initial source of the paper form is not limited in the present invention. Any form that has a header and table content and can present data or content in the form of one row/column or multiple rows/columns belongs to the form in the present invention.

At S2, electronic processing is performed on the paper form handwritten by the user to obtain a corresponding PDF electronic form.

Converting a paper form into a PDF electronic form is generally accomplished by scanning, for example, using a scanner to scan and define an output format as PDF, thereby obtaining a PDF electronic form corresponding to that in the previous step.

At S3, optical character recognition is performed on the PDF electronic form to acquire a character string and locations of all characters in the PDF electronic form.

Optical character recognition, referred to as OCR, is the most commonly used character recognition technology, which can recognize a character string and locations of all characters in a PDF electronic form, so that all the characters in the character string can be processed separately in subsequent steps.

In this step, the accuracy of optical character recognition is closely related to the clarity of handwriting when the user handwrites in step S1. The clearer and neater the handwriting, the more accurate the recognition. Additionally, it should be noted that even if the user's handwriting is inaccurate and unclear, resulting in recognition errors or omissions, the recognition errors or omissions can be corrected by the present invention in subsequent steps, which will be explained in detail below.

At S4, a page coordinate system is constructed for the PDF electronic form to acquire coordinates of an input form field of the PDF electronic form in the page coordinate system.

The page coordinate system is generally constructed with the lower left corner of the page as the origin, the lower edge of the page as the X-axis, and the left edge of the page as the Y-axis.

The input form field refers to an independent table area. The paper form may include one table, or may include multiple independent tables. Each independent form area corresponds to an input form field. Therefore, the input form field can also be one or multiple in number. When there are multiple input form fields, the subsequent process can be executed separately for each input form field.

At S5, coordinates of the input form field in the physical coordinate system are calculated.

If the set physical coordinate system is the same as the page coordinate system, this step is not required. If the two are different, this step is required to be performed.

At S6, a user input area is constructed and initialized, wherein the range of the initialized user input area is the same as the range of the input form field.

At S7, each character in the character string acquired in step S3 is traversed with a traversal rule as follows: for each character, if the physical coordinates of the location of the character intersect with the physical coordinates of the input form field, the area where the character is located is further incorporated in the user input area until all characters in the character string are traversed.

The purpose of steps S6 and S7 is to recognize which specific areas the user has handwritten. During the handwriting input of the user, due to personal habits, table height/width and other factors, the user handwritten content may not all be within the range limited by the table lines. In order to avoid missing the user handwritten content, a comprehensive inspection is carried out through these two steps, so that all areas where the user handwritten characters are located are included in the user input area.

At S8, according to the user input area obtained in step S7, a mask form field corresponding to the input form field is created on a page of the PDF electronic form, and a type of the mask form field is defined as "button".

According to the generation method of the mask form field, it can be seen that its area covers all user handwritten areas.

At S9, a value of the input form field is defined as the character string acquired in step S3.

At S10, a picture corresponding to the mask form field is intercepted from the PDF electronic form and set as the appearance of the mask form field.

In steps S9 and S10, two major attributes of the mask form fields are defined: value and appearance, wherein "value" is a character string that can be recognized by a computer, and "appearance" ensures that the user's handwriting is saved.

At S11, a PDF script is added to the mask form field, the content executed by the PDF script of the mask form field being: if the user clicks the mask form field, the mask form field disappearing, automatically focusing the input form field below the mask form field and entering an editing state; and after the user quits the editing, redisplaying the mask form field.

At S12, a PDF script is added to the input form field, the content executed by the PDF script of the input form field being: hiding the mask form field after acquiring a focus, and redisplaying the mask form field after losing the focus.

In steps S11 and S12, the script adding process is completed, and the PDF electronic form is correspondingly presented according to the user's manual operations. If the characters recognized in step S3 are wrong or missing, the user can click the mask form field, which will display the input form field and enter an editing state. The user can manually correct the wrong characters or add unrecognized characters.

Figure 2:
FIG. 2 is a schematic diagram of an input form field according to an embodiment of the present invention.

FIG. 1 is a schematic diagram of a mask form field according to an embodiment of the present invention, and FIG. 2 is a schematic diagram of an input form field according to an embodiment of the present invention. As shown in FIG. 1 and FIG. 2, the item handwritten by the user is "Nationality", and the content handwritten is "Chinese". It can be seen that the area handwritten by the user exceeds the underlined area of the form. At this time, a covered form field recognized by the present invention includes all the areas (gray shaded areas) covered by the characters handwritten by the user. If the user clicks the covered form field at this time, the input form field below the covered form field will be displayed, as shown in FIG. 2. Since this user's handwriting is clear and legible, it can be clearly recognized that the handwritten content is the Chinese word "Chinese", the vertical line "|" behind is a cursor prompt, which flashes to remind the user of the current input location. After the user quits the editing state, FIG. 1 is displayed, showing the original input handwriting of the user.

The method for inputting handwritten form data into a PDF electronic form provided by the present invention can save the original input handwriting of users and ensure that the appearances of the electronic forms are highly consistent with the appearances of the handwritten paper forms, and also may ensure that the content input by the users can be processed by background applications of the electronic forms.

It can be understood by those of ordinary skill in the art that: the accompanying drawing is only a schematic diagram of an embodiment, and the modules or processes in the accompanying drawing are not necessarily necessary for implementing the present invention.

It can be understood by those of ordinary skill in the art that: the modules in the device in the embodiment may be distributed in the device in the embodiment as described in the embodiment, or may be located in one or more devices different from that in this embodiment with corresponding changes. The modules in the above embodiments can be combined into one module, or may be further divided into multiple sub-modules.

Finally, it should be noted that the above embodiments are only used to illustrate the technical solution of the present invention, but not to limit it; although the present invention has been described in detail with reference to the foregoing embodiments, it should by understood by those of ordinary skill in the art that: it is still possible to make modifications to the technical solutions recorded in the foregoing embodiments, or to make equivalent substitutions for some of the technical features therein. However, these modifications or substitutions do not cause the essence of the corresponding technical solutions to deviate from the spirit and scope of the technical solutions of the embodiments of the present invention.

The invention claimed is:

1. A method for inputting handwritten form data into a PDF electronic form, comprising:

S1: handwriting, by a user, a paper form;

S2: performing electronic processing on the paper form handwritten by the user to obtain a corresponding PDF electronic form;

S3: performing optical character recognition on the PDF electronic form to acquire a character string and locations of all characters in the PDF electronic form;

S4: constructing a page coordinate system for the PDF electronic form to acquire coordinates of an input form field of the PDF electronic form in the page coordinate system;

S5: calculating coordinates of the input form field in the physical coordinate system;

S6: constructing a user input area and initializing the user input area, wherein the range of the initialized user input area is the same as the range of the input form field;

S7: traversing each character in the character string acquired in step S3 with a traversal rule as follows: for each character, if the physical coordinates of the location of the character intersect with the physical coordinates of the input form field, the area where the character is located is further incorporated in the user input area until all characters in the character string are traversed;

S8: according to the user input area obtained in step S7, creating a mask form field corresponding to the input form field on a page of the PDF electronic form, and defining a type of the mask form field as "button";

S9: defining a value of the input form field as the character string acquired in step S3;

S10: intercepting a picture corresponding to the mask form field from the PDF electronic form and setting the picture as the appearance of the mask form field;

S11: adding a PDF script to the mask form field, the content executed by the PDF script of the mask form field being: if the user clicks the mask form field, the mask form field disappearing, automatically focusing on the input form field below the mask form field and entering an editing state; and after the user quits the editing, redisplaying the mask form field; and S12: adding a PDF script to the input form field, the content executed by the PDF script of the input form field being: hiding the mask form field after acquiring a focus, and redisplaying the mask form field after losing the focus.

2. The method for inputting handwritten form data into a PDF electronic form according to claim 1, wherein the paper form has at least one table, and correspondingly, the electronic form has at least one input form field.

3. The method for inputting handwritten form data into a PDF electronic form according to claim 1, wherein the electronic processing on the paper form in step S2 is performed through a scanner.

* * * * *